Nov. 5, 1957 H. M. BRUNN 2,812,206
FISH AND GAME CARRIER
Filed Feb. 6, 1956
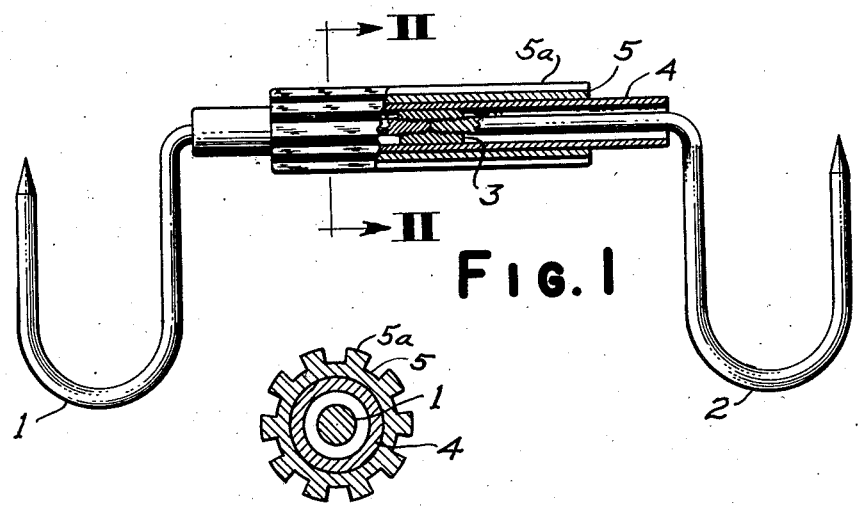
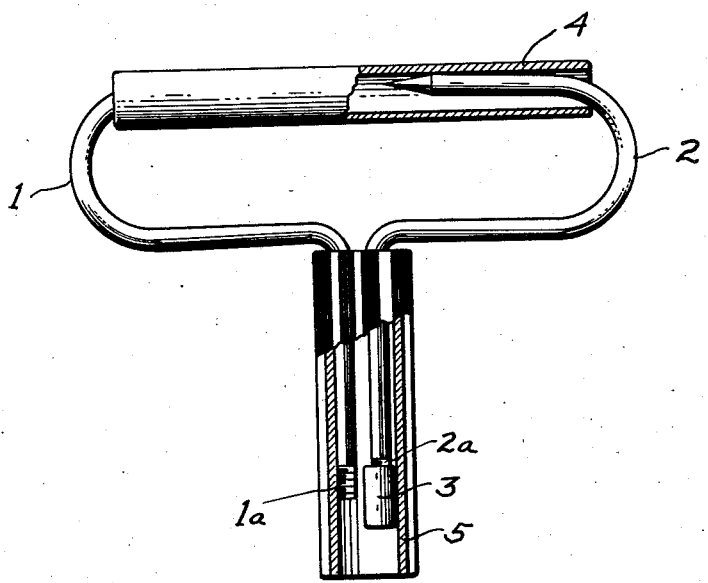
INVENTOR:
HENRY M. BRUNN
BY
HIS ATTORNEY United States Patent Office 2,812,206
Patented Nov. 5, 1957

2,812,206

FISH AND GAME CARRIER

Henry M. Brunn, Pittsburgh, Pa.

Application February 6, 1956, Serial No. 563,627

2 Claims. (Cl. 294—79)

This invention relates to a fish and game carrier, and, more particularly, to a carrier or hanger assembly including hooks and tubular parts which are so arranged that they may be selectively connected in either the operating position for carrying fish and game, or compactly assembled so that the parts may be carried as one unit in the pocket without projecting edges which might damage or tear the pocket lining or cause injury.

In the past, fish or game carriers have been devised which included hooks and which were of such construction as to be foldable into a smaller unit to facilitate carrying. However, such units have not been commercially adopted inasmuch as they have outstanding disadvantages, such as being complicated in construction and involving high cost of manufacture. Moreover, when folded for carrying fish or game, they still present sharp edges which might tear the clothes or injure the sportsman. Additionally, they are not compacted into a sufficiently small unit to enable carrying in a small pocket.

An object of my invention is to provide a novel fish and game carrier which is devoid of the above named disadvantages of previous carriers and which is of relatively simple, inexpensive and easily assembled or disassembled construction.

A more specific object of my invention is to provide a novel fish and game carrier which includes hooks and tubular parts which are so constructed that the hooks and tubular parts each serve a dual function and selectively constitute either part of the handle, when the unit is compacted for carrying in a pocket, or part of the hook or handle when the hooks are in the operating position, that is, when in readiness to carry fish or game caught by the sportsman.

A still more specific object of my invention is to provide a fish and game carrier involving a pair of hooks, a handle and a handle grip arranged so that the hooks are of identical construction and interchangeable, and which may be fastened in operating position so as to be supported by the handle and grip, or selectively assembled in a manner so that the handle grip and handle will closely encircle the sharp ends as well as the opposite ends of the hooks to avoid exposure of any sharp projecting edges and thus enable an extremely compact unit to be formed for carrying in the pocket of the hunter as when going to the hunting site.

Other objects and advantages of the present invention will become apparent from a study of the following description taken with the accompanying drawing wherein:

Figure 1 is a front elevational view of a fish and game carrier assembly embodying the present invention, and in the operating position 7 and wherein the handle and handle grip are shown partly in cross section to illustrate how the hooks are held together;

Figure 2 is an enlarged transverse cross-sectional view taken along line II—II of Figure 1; and Figure 3 is a side elevational view showing the same parts illustrated in Figures 1 and 2, but arranged differently, that is, in a compact unit which can be safely carried in the pocket.

Referring more particularly to the drawing, numerals 1 and 2 denote U-shaped hooks made of metal wire of steel, aluminum or other suitable metal. The extreme ends of the hooks 2 are pointed and the other ends are disposed at right angles to the extremity of the U and terminate in threaded portions 1a and 2a.

When the fish and game carrier assembly is to be used for transporting fish, rabbits, groundhogs and other game, it is arranged or assembled in the manner shown in Figures 1 and 2. That is, the threaded ends 1a and 2a of the hooks are screw threadedly engaged with the internally threaded end portions of a connecting tubular bushing 3. A cylindrical or tubular handle 4 surrounds the end portions of the hook and a tubular handle grip 5 made of fiber, rubber or other suitable material, is telescopically slipped over the tube 4 and closely fitted thereto, as shown in Figures 1 and 2, therefore providing sufficient friction as to prevent relative movement between handle 4 and handle grip 5, particularly when hooks 2 are weighted with game. Hand grip 5 may be provided with flutes or serrations 5a to provide a tighter hold. Of course, the handle or tube 4 and handle grip 5 are slipped together before the ends of the hooks are screw threaded to bushing 3.

It will be readily apparent that when the fish and game carrier is assembled in the manner shown in Figures 1 and 2, the hunter will grasp the handle grip 5 to carry the assembly as well as the fish and game that may be hooked onto the hooks 1 and 2. Large numbers of fish or game can be carried by the two widely separated hooks.

When it is desired to carry the assembly in the hunter's pocket, it may be very compactly assembled in the manner shown in Figure 3. Here it will be seen that the handle or tube 4 surrounds the sharp ends of the hooks and is used as a protector or guard to prevent injury to the hunter or his clothing by the sharp ends of hooks 1 and 2. Likewise the handle grip 5 is used as a protector or guard for the somewhat but less sharp ends 1a and 2a. It will also be observed that tube 4 and hand grip 5 hold the hooks 1 and 2 tightly together by virtue of the springiness of the lower or threaded ends of hooks 1 and 2 when the upper ends are in the position shown in Figure 3. That is to say, threaded parts 1a and 2a are normally sprung apart to a greater extent than shown in Figure 3 and are forced together and held in this manner by hand grip 5, resisted by the resiliency of the U-shaped portions of the hooks. Therefore no additional parts are needed for holding the various parts in the position shown in Figure 3, which greatly simplifies the construction and reduces its cost, as well as insuring minimum overall size of the assembly.

It will be further noted that the assembly shown in Figure 3 could also be used as a handle for carrying objects which may be supported by a threaded shaft (not shown) which can be screw threadedly connected to bushing 3.

Thus it will be seen that I have provided a novel fish and game carrier assembly wherein the parts are of such construction that they may be assembled either in the operating or carrying position, or may be assembled in a compact manner for safe carrying in the pocket of the sportsman without exposure of sharp or projecting edges; furthermore I have provided a fish and game carrier assembly made up of the minimum number of simple and inexpensively manufactured parts, each of which has a dual function, that is, which serves either as an operating part of the assembly when in operating position for carrying fish and game, or as a protective part when the assembly is put together for the purpose of carrying in the pocket; furthermore I have provided a fish and game carrier which can be compactly assembled into an exceedingly small unit having no sharp edges whatsoever, and which require no additional connectors for keeping the parts compactly together.

While I have illustrated and described one embodiment of my invention, it will be understood that this is by way of illustration only, and that various changes and modifications may be made within the contemplation of my invention and within the scope of the following claims.

I claim:

1. A fish and game carrier comprising a pair of substantially U-shaped hooks, each having an end portion extending substantially at right angles to one of the extremities of the U, the other extremity being pointed, detachable means for holding said end portions together in end-to-end relationship, a tube closely surrounding said end portions when secured together, and a tubular handle grip selectively used either to telescopically surround said tube when the hooks are in operating position and in said end-to-end relationship, or for surrounding said threaded end portions when the parts are arranged for carrying in the pocket of a sportsman, in which latter instance said tube is adapted to surround the pointed ends of said hooks to prevent tearing of the pockets of the sportsman, whereby said tube and tubular handle grip each has a dual operating as well as protective function.

2. A fish and game carrier comprising a pair of hooks, each being of substantially U-shape and having one of its extremities pointed, and the other having an end portion extending substantially at right angles from the other extremity of the U, the extreme ends of said end portions being threaded, a bushing having internal threads for holding said threaded end portions together in end-to-end abutting relationship and so that the hooks will extend in the same plane, a cylindrical tube closely surrounding said bushing and said end portions of the hooks, and a handle grip telescopically fitted over said tube, whereby the parts may be selectively assembled in either the operating position, as described, or in a compact position for carrying in the pocket, and when in the latter position, said tube being arranged so as surround the hooked end portions of said hooks, and said handle grip being arranged to surround the threaded end portions of said hooks, said latter end portions being frictionally held within said handle grip because of the resiliency or spring action of the U-shaped portions of said hooks.

No references cited.